United States Patent Office 3,335,988
Patented Aug. 15, 1967

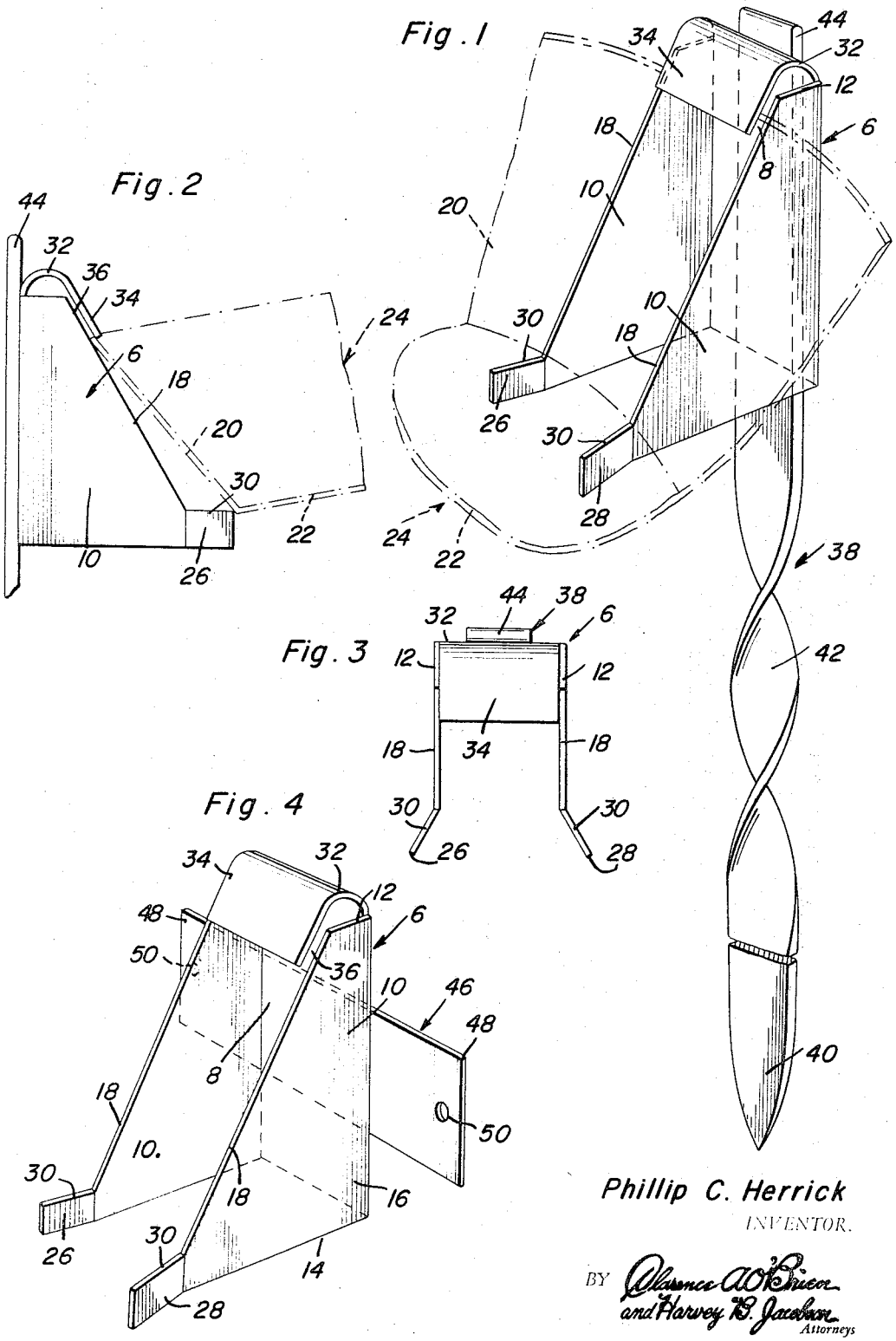

3,335,988
SKILLET HOLDER
Phillip C. Herrick, Harmony, Maine 04942
Filed Aug. 30, 1965, Ser. No. 483,414
6 Claims. (Cl. 248—121)

ABSTRACT OF THE DISCLOSURE

An outdoor-type bracket which serves as a holder for a frying pan and is (1) secured to the upper end of a ground-anchored elevating stake or (2) to a plate-type cleat which can be nailed to a tree, the end of a stout log, or other available support. The one piece bracket is made of sheet metal, is channel-shaped in cross-section and the flanges serve as abutments and have sloping edges and bottom lugs. A resilient hook overhangs the downwardly sloping edges. These several component parts support and clampingly suspend the rim of the pan.

---

The present invention relates to certain new and useful improvements in means for elevating and adequately supporting a conventional frying pan in a food containing and frying position, that is, in cooperative relation to the outdoors campfire or the like.

More particularly, novelty is predicated on a structurally and functionally unique bracket which constitutes and provides a holder for the frying pan and which can be attached to an upper end of a ground penetrating stake or attached to or equipped with a simple cleat or plate which can be nailed, wired or otherwise secured to a tree, to the end of a log, or other equivalent stationary support.

Compared, generally speaking, with broadly analogous holding clips and the like for trays, plates, cups and so on the herein disclosed concept is directed to a suitable and satisfactory adaptation which is an original, practical and feasible cooking aid, one which does not depend on distortion, springs, lock nuts or extraneous equipment to accomplish its holding mission and, accordingly, well serves the purposes for which it has been produced.

In carrying out the principles of the present invention a novel, highly useful and efficient bracket has been evolved and produced, one which lends itself to reliable use in conjunction with commercially built skillets and frying pans and which features means for holding the pan rigid by the use of the weight of the pan itself and, more particularly, by the slope or slant of the flange-like rim with which the pan is, as usual, provided.

More explicitly, the invention is characterized by bracket means embodying a pair of spaced parallel members provided with coplanar abutments, more particularly, a pair of forwardly and downwardly inclined edges which serve as sloping abutments and which are adapted to abut the outer peripheral surface of the rim of the pan. The bracket or equivalent means is also provided with a pair of lugs which are disposed lateral to lower end portions of the aforementioned abutments and which constitute and provide rests, that is, feet-like elements which underlie a cooperating marginal part of the pan's bottom. Then, too, rim piloting, positioning and holddown means, more explicitly, a clip overhangs coacting upper edge portions of the abutments and preferably comprises a broad-bill resilient hook which is not only hooked over the upper edge of the rim of the pan but is yieldingly clenched against an interior surface of the rim to achieve the excellent holding results desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a skillet holder constructed in accordance with the principles of the invention, showing a fragmentary portion of the skillet or frying pan in phantom lines and also showing the bracket mounted on a ground penetrating and anchoring stake;

FIGURE 2 is a view in side elevation of the structure shown in FIGURE 1 but limited to a showing of the upper portion and which serves to show how the rim of the pan can be slipped into position underneath the hook-like clip or removed as the case may be;

FIGURE 3 is a top plan view of the form of the invention shown in FIGURES 1 and 2; and FIGURE 4 is a view in perspective which shows the same bracket but omits the stake and substitutes a plate-type cleat which is so constructed and arranged that it can be wired to a tree, nailed on a stump, log or whatever stationary support is available at the time.

It will be evident that insofar as the bracket is concerned it is the same in all of the figures shown in the drawing. Accordingly, like reference characters designate like parts throughout the views.

To the ends desired the bracket is made or fashioned from appropriate sheet metal possessed of the prerequisites of strength, durability, appearance and other requirements which will be taken into account by manufacturers, wholesalers, retailers and users. The bracket preferred is denoted by the numeral 6 and is channel-shaped in cross-section. Accordingly, it embodies a flat central web 8 and a pair of spaced parallel forwardly projecting flanges 10. These flanges are identical in construction but could be referred to as left and right if necessary to differentiate. The straight across top end of each flange is denoted at 12 and the parallel straight bottom edge as 14 (FIG. 4). The rearward edge portion 16 is joined with the web. The forward longitudinal edge slopes outwardly and downwardly at 18 and provides the aforementioned abutment for receptive seating and maintenance of the oblique angled rim or wall 20 joined to the bottom 22 of a conventional-type frying pan 24. The lower end portions of the flanges at the juncture of the edges 18 and 14 are provided with substantially rectangular outwardly projecting left and right lugs 26 and 28 whose upper edges 30 are coplanar and spaced apart and serve when in use to underlie the marginal part of the bottom 22 of the frying pan 24 in the manner suggested in FIG. 1. It will be evident, therefore, that the abutments 18 and the lugs or feet 26 and 28 provide circumferentially spaced support members for the bottom and rim portions of the pan. It is necessary, however, to make sure that the pan will stay put under its own weight and to achieve this end result a resilient holddown clip is provided. More specifically the clip comprises an extension of the upper end of the web or bight portion of the channel. This is to say the extended portion is bent upon itself as at 32 and the depending lip, which is yieldable, extends across the space between the flanges 10 and provides a retaining hook 34. This hook is spaced slightly as denoted at 36 to permit application and removal of the rim of the pan in the manner illustrated for example in FIG. 2.

With this construction it will be evident that when the pan is clipped on the bracket it is steady, level, and can be held at a constant height from the heat and will diminish the likelihood of the user burning his hands while cooking. Then, too, the bracket provides a feasible resting place for the frying pan after serving the contents. It follows that the bracket is such that it can be justly endorsed as a step in the right direction with modern camping practices in mind.

The support means for the bracket shown in FIG. 1 comprises a simple metal or equivalent strip member which is fashioned into a stake 38. The stake has a pointed lower end 40 which can be forced into the ground, has a twisted or screw portion 42 which facilitates anchorage. The upper flat portion 44 is superimposed on the web of the bracket, that is the bight portion 8 and is welded or otherwise secured thereto.

If the stake is not desired for use it is within the purview of the invention to employ a simple plate-like cleat 46 which as shown in FIG. 4 is rectangular and of a length that the median portion can be fastened on the bight portion 8 with the ends extending therebeyond as at 48 having nailing or wire accommodating holes 50.

It is reiterated that the invention disclosed, more particularly the novel bracket, actually grasps a skillet or frying pan and does so without requiring the use of springs or involving distortion and shape of the component parts of the invention. In keeping with this invention the structure can be in the form of a stand (FIG. 1) including a stake, or the alternative form shown in FIG. 4 and characterized by a wing-like cleat can be used, can be nailed, tacked or wired to the end of a log or tree. With the construction shown the bracket is suitable to clip itself in position on commercially made skillets having a 30 degree or flare embodied in the rim of the pan. It should be noted, too, that the clamping or grasping action is such that the skillet is kept close to the supporting means and therefore very little pressure is exerted on the means itself. It follows that the invention herein shown, described and claimed aptly serves the practical and feasible purposes for which it has been devised and perfected. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. In combination, a conventional frying pan having a substantially flat bottom encompassed by an upstanding outwardly flaring rim, and means for elevating and supporting said pan in a food containing and frying condition adjacent an outdoors fire, said means embodying a one piece pan seating and holding bracket including a pair of spaced parallel flanges provided with coplanar outwardly downwardly sloping edges constituting coordinating abutments, said abutments being adapted to abut and cooperate with the outer peripheral surface of the aforementioned outwardly flaring rim, further provided with complemental lugs lateral to and projecting outwardly beyond the lower end portions of said abutments and providing a pair of rests which when in use underlie a marginal part of the pan's bottom, and an integral rim piloting, positioning and holddown clip bridging the space between the upper portions only of said flanges and overhanging coacting upper edge portions of the respective abutments, said clip being resilient, fashioned into and providing a hook, said hook being releasably hooked over the upper edge of said rim, depending into the receptacle portion of the pan and yieldingly clenched against an interior surface of said rim, whereby the rim rests firmly and conformingly against said abutments and is held in place by said lugs, abutments and holddown clip.

2. The structure according to claim 1, and wherein said lugs are rectangular in side elevation, are alike in construction and have upper horizontal coplanar pan bottom seating edges, said lugs being flared outwardly and are thus disposed in divergent relationship, said upper edges being thus capable of contacting surfaces of said bottom at circumferentially spaced places.

3. The structure defined in claim 2, and, in combination, support means for said bracket having the capability of locating the bracket and a pan relative to the flame of the fire.

4. The structure defined in claim 2, and, in combination, support means for said bracket having the capability of locating the bracket and pan relative to the flame of the fire, said support means comprising a stake whose lower end is pointed and intended to be forced and anchored in the ground and whose upper end is affixed to said bracket.

5. The structure defined in claim 2 and, in combination, support means for said bracket having the capability of locating the bracket and pan relative to the potential flame of the fire, said support means comprising a cleat fixed on said bracket and adapted to be nailed or wired to a tree or other suitable place for anchorage.

6. A frying pan clamping bracket capable of being mounted on support means and adapted for outdoor use when employing the frying pan over the flames of an open fire comprising a one piece sheet metal bracket channel-shaped in cross-section and embodying a pair of spaced parallel side flanges joined at corresponding edges by way of an intervening web, said flanges having outwardly and downwardly sloping edges constituting abutments and designed and adapted to reside in contact with an exterior surface of the rim of the frying pan which is to be supported thereby, said flanges being provided at corresponding lower ends with complemental forwardly and outwardly directed lugs, said lugs providing supporting feet and being adapted to project beneath and support a coacting bottom portion of said pan, and resilient hook means carried by the upper portion of said bracket, said hook means comprising an extension of the upper end of the web of the channel bracket, said extension being bent upon itself and forwardly and downwardly and providing a resilient hook-like clip, said clip being spaced from cooperating portions of the sloping edges and capable of serving as a holddown clamp and being yieldingly engageable with an interior surface of the aforementioned rim.

References Cited

UNITED STATES PATENTS

| | | | |
|---|---|---|---|
| 1,452,640 | 4/1923 | Hulick | 248—121 |
| 1,873,297 | 8/1932 | Davenport | 248—311 |
| 2,879,966 | 3/1959 | Carroll | 248—311 |

ROY D. FRAZIER, *Primary Examiner.*

JOHN PETO, *Examiner.*

J. F. FOSS, *Assistant Examiner.*